UNITED STATES PATENT OFFICE.

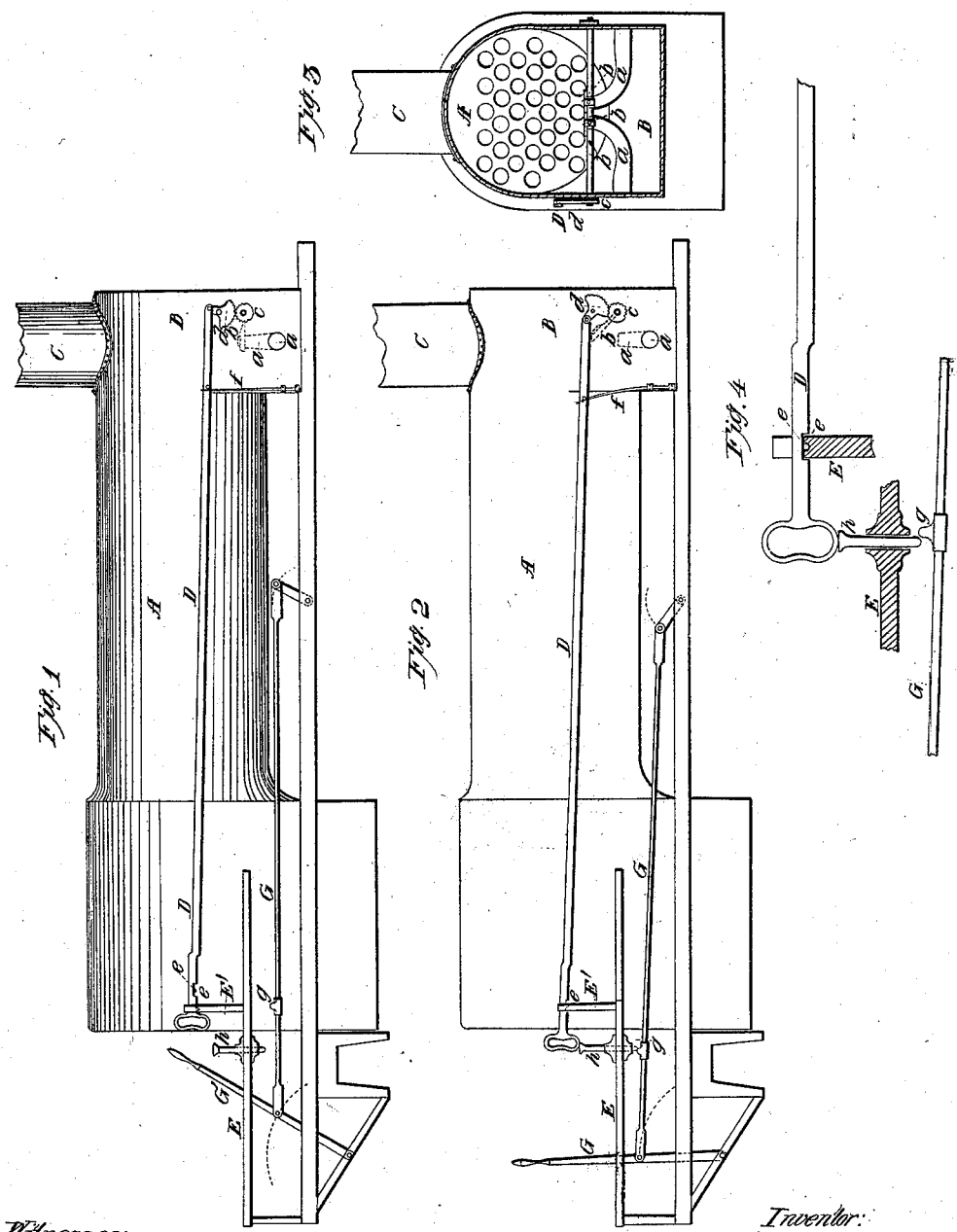

JOHN C. PARKER, OF CHICAGO, ILLINOIS.

IMPROVEMENT IN LOCOMOTIVES.

Specification forming part of Letters Patent No. 58,127, dated September 18, 1866.

*To all whom it may concern:*

Be it known that I, JOHN C. PARKER, of Chicago, in the county of Cook and State of Illinois, have invented a new and Improved Air, Gas, and Cinder Arrester for Locomotives; and I do hereby declare that the following is a full, clear, and exact description thereof, reference being had to the accompanying drawings, making a part of this specification, in which—

Figure 1 is an elevation of a portion of a locomotive-engine having my invention applied to it. Fig. 2 is a view of the same parts, showing the levers and rods arranged for keeping the valves over the exhaust-nozzles open. Fig. 3 is a vertical section through the smoke-box of a locomotive-engine, showing the valves applied to the two exhaust-nozzles. Fig. 4 is an enlarged view in detail, showing the manner of tripping the draw-rod that communicates with the valves over the exhaust-nozzles.

Similar letters of reference indicate corresponding parts in the several figures.

This invention relates to an improvement in locomotive-engines, whereby cinders, air, and gas are prevented from being admitted to the valve chests and cylinders through the exhaust-pipes.

The nature of my invention consists in providing the nozzles of the exhaust-pipes with valves that are applied to an oscillating rod, and in combining therewith an arrangement of levers and connecting-rods, whereby the said valves will be closed when the engineman moves the reversing-lever to reverse the valve-motion or to stop the engine, as will be hereinafter described.

To enable others skilled in the art to understand my invention, I will describe its construction and operation.

In the accompanying drawings, A represents a locomotive-boiler, B the smoke-box, and C the smoke-pipe, which may be constructed in any well-known manner.

The exhaust-nozzles $a\ a$ lead from the steam-chests into the smoke-box in the usual manner, and on the upper ends of these nozzles valves $b\ b$ are applied, which, when closed, will prevent the passage of air, gas, or cinders into the working parts of the engine. It is my desire to keep these valves open, so as to allow of the free escape of the exhaust-steam into the smoke-box during the working of the engines when steam is let into the valve-chests, and when steam is cut off to stop or reverse the engine.

The valves $b\ b$ are secured to a horizontal rod, $b'$, which passes transversely through the smoke-chamber B, and carries on one end a segment, $c$. This segment engages with another segment, $d$, which is pivoted to the outside of the chamber-wall B and connected to a draw-rod, D. This rod D proceeds back and passes through an opening which is made through a supporting-piece, $E'$, of the frame E, as shown in Figs. 1 and 4. This rod D is provided with a handle on its rear end, and slightly forward thereof, and in the lower edge of this rod, a notch, $e$, is made, with a stud, $e'$, so that when the rod is moved back to the position shown in Figs. 2 and 4, this notch and spur will be caught and held by the supporting-piece $E'$. When this rod D is released a spring, $f$, will force it forward and effect the closing of the two valves $b\ b$, as shown in Fig. 1.

The reversing-rod G has a toe, $g$, applied to it, for the purpose of lifting a slide, $h$, which is arranged in a vertical plane beneath the rear end of the draw-rod D, as shown in Figs. 1, 2, and 4, so that when this rod D is in the position shown in Figs. 2 and 4, and the valves open, by moving the reversing-lever $G'$ forward the toe $g$ will lift the slide $h$ and release the rod D, thus effecting the closing of the valves. The valves being closed and steam cut off, they will remain in this position until steam is again let into the engine, when the force of the exhaust will open the valves and cause the rod D to move backward and be caught and held, as above described.

The mode of operation is as follows: Suppose the engine to be at rest, with the valves $b\ b$ closed, and the rod D in its forward position, also the lever $G'$ in its forward position. The engineer now gives the engine steam, and as soon as it begins to move the exhaust-steam will force the valves $b\ b$ open and the rod D back to the position shown in Figs. 2 and 4. The handle of the rod D will then rest upon the upper end of the slide $h$. We will now suppose that the engineer wishes to stop the engine. He first shuts off steam, and then draws the lever G' back to reverse the engine, in which latter movement the toe g on the rod G comes in contact with the slide h and raises the rod D, so as to allow the spring f to force this rod forward and close the valves b b, so that neither sparks nor air can pass into the nozzles of the exhaust-pipes. Thus it will be seen that there is a certainty of closing the valves, in case the engineer should neglect to close them, by taking hold of the handle of the draw-rod D and moving it forward for that purpose.

Having thus described my invention, what I claim as new, and desire to secure by Letters Patent, is—

1. Providing the nozzles of the exhaust-pipes of a locomotive-engine with valves which shall be allowed to close by a movement of the reversing-lever, substantially as described.

2. The combination of the draw-rod D and valves b b with the spring f and a contrivance which will effect the tripping of said rod when the engine is reversed, substantially as described.

JOHN C. PARKER.

Witnesses:
SAMUEL D. ALLEN,
JACOB BARNEY.